United States Patent
Biswas et al.

(10) Patent No.: US 11,275,877 B2
(45) Date of Patent: Mar. 15, 2022

(54) HARDWARE SIMULATION SYSTEMS AND METHODS FOR REDUCING SIGNAL DUMPING TIME AND SIZE BY FAST DYNAMICAL PARTIAL ALIASING OF SIGNALS HAVING SIMILAR WAVEFORM

(71) Applicant: Synopsys, Inc., Mountain View, CA (US)

(72) Inventors: Parijat Biswas, Mountain View, CA (US); Sitikant Sahu, Mountain View, CA (US); Rahul Garg, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/586,829

(22) Filed: Sep. 27, 2019

(65) Prior Publication Data

US 2020/0104443 A1    Apr. 2, 2020

(30) Foreign Application Priority Data

Sep. 27, 2018   (IN) .............................. 201811036396

(51) Int. Cl.
    G06F 30/20    (2020.01)
    H04L 9/06     (2006.01)
    G06F 11/07    (2006.01)
    G06F 30/30    (2020.01)

(52) U.S. Cl.
    CPC .......... *G06F 30/20* (2020.01); *G06F 11/0778* (2013.01); *G06F 30/30* (2020.01); *H04L 9/0643* (2013.01)

(58) Field of Classification Search
    CPC ...................................... G06F 30/20
    USPC ............................................... 716/107
    See application file for complete search history.

(56) References Cited

U.S. PATENT DOCUMENTS

| | | | |
|---|---|---|---|
| 7,526,419 B2 | 4/2009 | Alley et al. | |
| 2013/0080983 A1* | 3/2013 | Craig | G06F 30/398 716/107 |
| 2016/0125111 A1* | 5/2016 | Yu | G06F 30/3323 716/106 |

OTHER PUBLICATIONS

Synopsys, Inc., Custom WaveView User Guide, Version F-2011. 09-SP1, Dec. 2011.
GTKWave, "GTKWave 3.3 Wave Analyzer User's Guide" Updated Apr. 6, 2019.
Springsoft, Inc., "Siloti, Visibility Automation System," SpringSoft, Inc. Novas Verification Enhancement Solutions, 2008.

* cited by examiner

*Primary Examiner* — Eric D Lee
(74) *Attorney, Agent, or Firm* — Weaver Austin Villeneuve & Sampson LLP

(57) ABSTRACT

Hardware simulation systems and methods for reducing signal dumping time and size of by fast dynamical partial aliasing of signals having similar waveform are provided. One example system is configured to receive, in real-time, a first signal from a producer entity; determine a first signal signature associated with the first signal; determine, in real-time, a second signal signature associated with the second signal; upon determining that the first signal signature matches the second signal signature, designate the first signal as a master signal and designate the second signal as a slave signal; and stop dumping the second signal to a storage space.

20 Claims, 8 Drawing Sheets

HARDWARE SIMULATION SYSTEMS AND METHODS FOR REDUCING SIGNAL DUMPING TIME AND SIZE BY FAST DYNAMICAL PARTIAL ALIASING OF SIGNALS HAVING SIMILAR WAVEFORM

CROSS-REFERENCE TO RELATED APPLICATION

This patent application claims priority from Indian Provisional Patent Application Serial Number 201811036396, titled "TECHNIQUE FOR REDUCING SIGNAL DUMPING TIME AND SIZE OF A HDL, BY FAST DYNAMICAL PARTIAL ALIASING OF SIGNALS HAVING SIMILAR WAVEFORM," filed Sep. 27, 2018, which is incorporated herein by reference in its entirety.

TECHNOLOGICAL FIELD

Embodiments of the invention relate, generally, to a hardware description language simulator.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMER

In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.

BACKGROUND

Dumping signals during simulation of a hardware description language (HDL) design and loading them in a waveform which could be displayed on a user interface is a common technique to debug the design. Dumping signals into a dump file stored on a storage puts up load of overhead to the HDL simulation speed. Dumping signals in the disk also increases the disk usage significantly. Therefore, optimizing the runtime overhead for dumping and the determining the optimal dump size is key for improving the verification/debug cycles of any given design.

It has also been observed that in some recent designs, there are lot of gated clocks. In such cases we end up having a huge number of fast signals with very similar waveforms. For example, as long the gate is on, the waveform of the leading and the following clock would be similar.

SUMMARY

The claims signify a brief description of one or more of the innovations, embodiments, and/or examples found within this disclosure.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

Even with aggressive static aliasing in HDL simulators, signals that gets dumped often have the same or similar waveforms. Sometimes the similarity is maintained for the entire simulation and sometimes the similarity is maintained only for certain duration of the simulation. Dynamic aliasing such signals would can lead to both runtime gains as less signals would get dumped, and considerable less dump size. However, accurately predicting whether the waveform of a dynamically aliased signal will remain the same for the entire simulation duration is a challenging issue. Accordingly, embodiments related to hardware simulation systems and methods for reducing signal dumping time and size of by fast dynamical partial aliasing of signals having similar waveform are provided herein. In some HDL designs, dynamic partial aliasing provided by example embodiments can reduce the count of signals to be dumped during simulation of HDL designs by as much as 20×, saving substantial storage space such as hard disk storage space. Reducing the count of signals to be dumped may also in turn save other computing resources utilized during simulation of HDL designs, such as central processing unit (CPU) computing power.

The innovations, embodiments, and/or examples found within this disclosure are not all-inclusive, but rather describe the basic significance of the subject matter. Accordingly, one use of this Summary is as a prelude to a Detailed Description presented later.

DRAWINGS

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

Figure 1A:
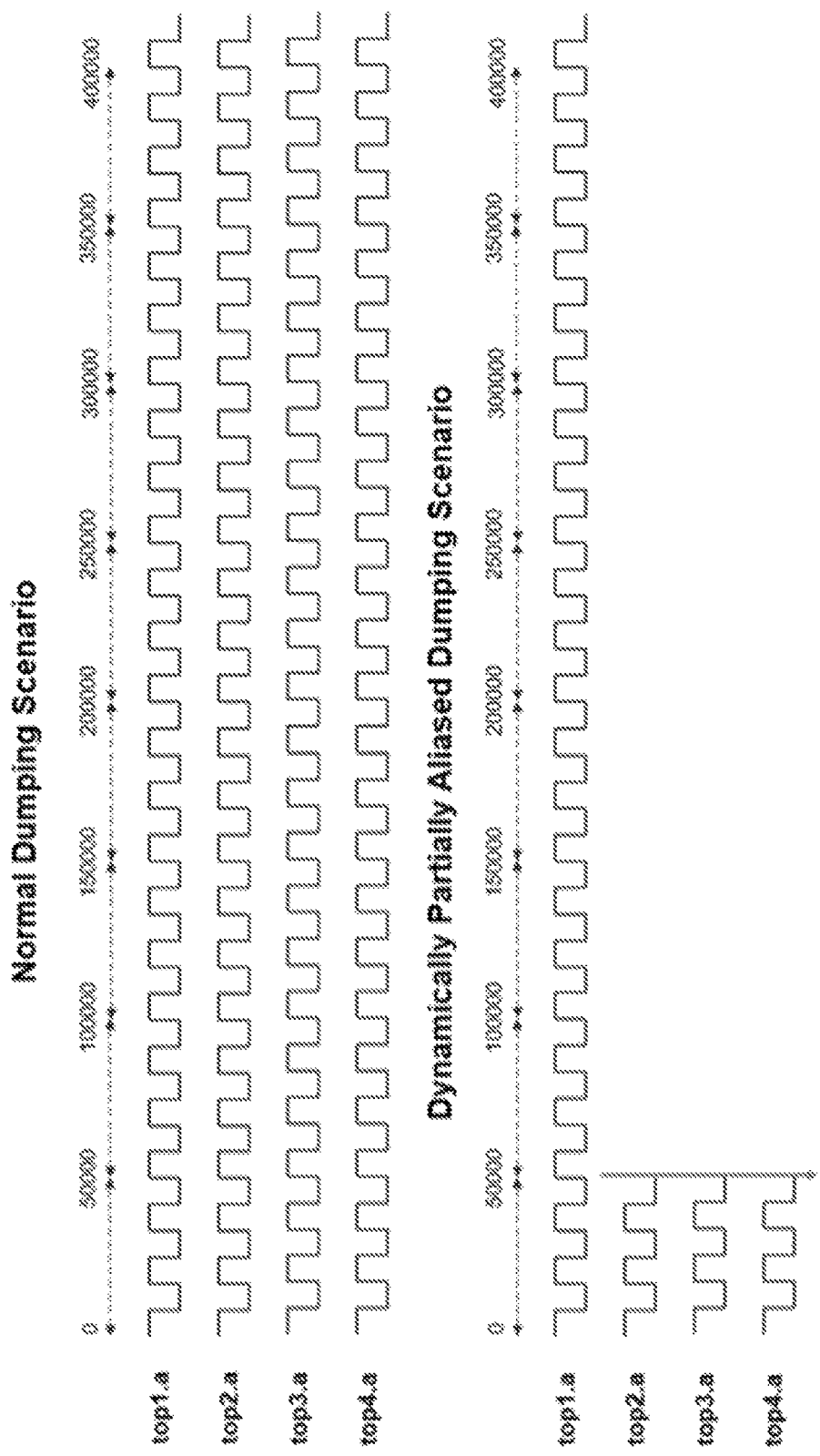
FIG. 1A illustrates example waveforms in accordance with an embodiment of the present disclosure.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Example HDL simulators may be performing compiled code generation. For example, the code being simulated may be generated in real-time. As a result, even in an HDL that can randomly execute events which are parallel, the code generator may enforce some order of evaluation for parallel events. HDL simulators have various queues like immediate, Nonblocking Assignment Events Region (NBA) or the like. Events may be scheduled in the queue and may be evaluated when the queue gets evaluated in a first-in-first-out (FIFO) basis.

As used herein, the term "producer entity" refers to a hardware description language simulator that is simulating a design in HDL. Upon value change of a signal, the producer entity may transmit the signal to a consumer entity and notify the consumer entity to dump that signal.

As used herein, the term "consumer entity" refers to a computing module that receives signals from the producer entity and dump the signal to a storage space, such as a hard disk drive. In some embodiments, the consumer entity and the producer entity may be run on the same central processing unit (CPU) thread or on separate CPU threads. In some embodiments, the consumer entity may also compress the signal before dumping the signal to the storage space.

As used herein, the term "reader entity" refers to a computing module that reads the dumped signal and render a waveform on a user interface based on dumped signal.

As used herein, the term "signal signature" refers to a pre-defined characteristic associated with a signal. In some embodiments, a signal signature is generated by hashing a pre-defined number of symbols (for example, bits) associated with a signal. In some embodiments, the signal may be hashed upon receipt of enough bits that satisfies the pre-defined number of symbols. In some embodiments, the signal may be hashed after a pre-defined interval after receiving the signal. In some embodiments, the pre-defined interval may be defined by number of symbols or time. In some embodiments, the signal signature may be updated based at a pre-defined interval. In some embodiments, the pre-defined interval may be a changing interval that varies depending on the time lapsed after receiving the signal.

A signal designated as a "master signal" may be a signal that is received before and has the same signal signature as a "slave signal". A master signal may be dumped into a storage space, such as a hard disk drive, during simulation of the HDL design. In some embodiments, the slave signal is not being dumped into the storage space if the master signal is dumped into the storage space. The slave signal may be stored as having the same value (e.g., symbols and bits) as the master signal which may also be referred as "following" the master signal. A master signal may correspond to more than one slave signal. In some embodiments, a slave signal can only correspond to one master signal. A slave signal is considered to be "aliased" with a master signal. In some embodiments, when the producer entity transmits signals to a consumer entity to dump signals, signal signatures of the received signals may be determined in real-time. After a pre-defined period of time or a pre-defined number of symbols are received, signals that have the same signal signature may be detected and the first received signal among the signals that have the same signal signature may be designated as the master signal and the other signals received may be designated as slave signals.

FIG. 1A illustrates example waveforms of a master signal top1.a and slave signals top2-4.a. In some embodiments, after 50000, the signal signatures are determined to be the same and signal top1.a is designated as master signal while signals top2.a, top3.a, and top4.a are designated as slave signals. Example pseudo-code for the module associated with the signals is provided below:

Here the waveform of 'a' in the modules, top1/top2/top3/top4 is similar.

---

```
module top1;
    integer a;
    initial
```

-continued

```
  begin
    a = 0;
    repeat(40000000)
      begin
        a = a + 2;
        #1;
      end
  end
endmodule
module top2;
  integer a;
  initial
  begin
    a = 0;
    repeat(40000000)
      begin
        a = a + 2;
        #1;
      end
  end
endmodule
// similar module top3/top4
```

As used herein, the term "de-aliasing criteria" refers to a set of conditions for determining that a first signal previously designated as the master signal and a second signal previously designated as the slave signal would be de-designated as master-slave signals. In some embodiments, de-aliasing criteria may be satisfied upon determining one of: 1) the master signal changed, and the slave signal did not change, 2) the slave signal changed at a certain time point and the master has not changed until that time in a current time step, or 3) the slave signal changed and it is detected (e.g., by a producer entity) that the master signal has changed more number of times than the slave signal. In some embodiments, the de-aliasing may be determined based on respective time-steps of the slave signal and the master signal where the time points associated with the slave signal and the master correspond to each other and align with regard to time lapsed compared to receipt of the respective symbol.

Figure 1B:
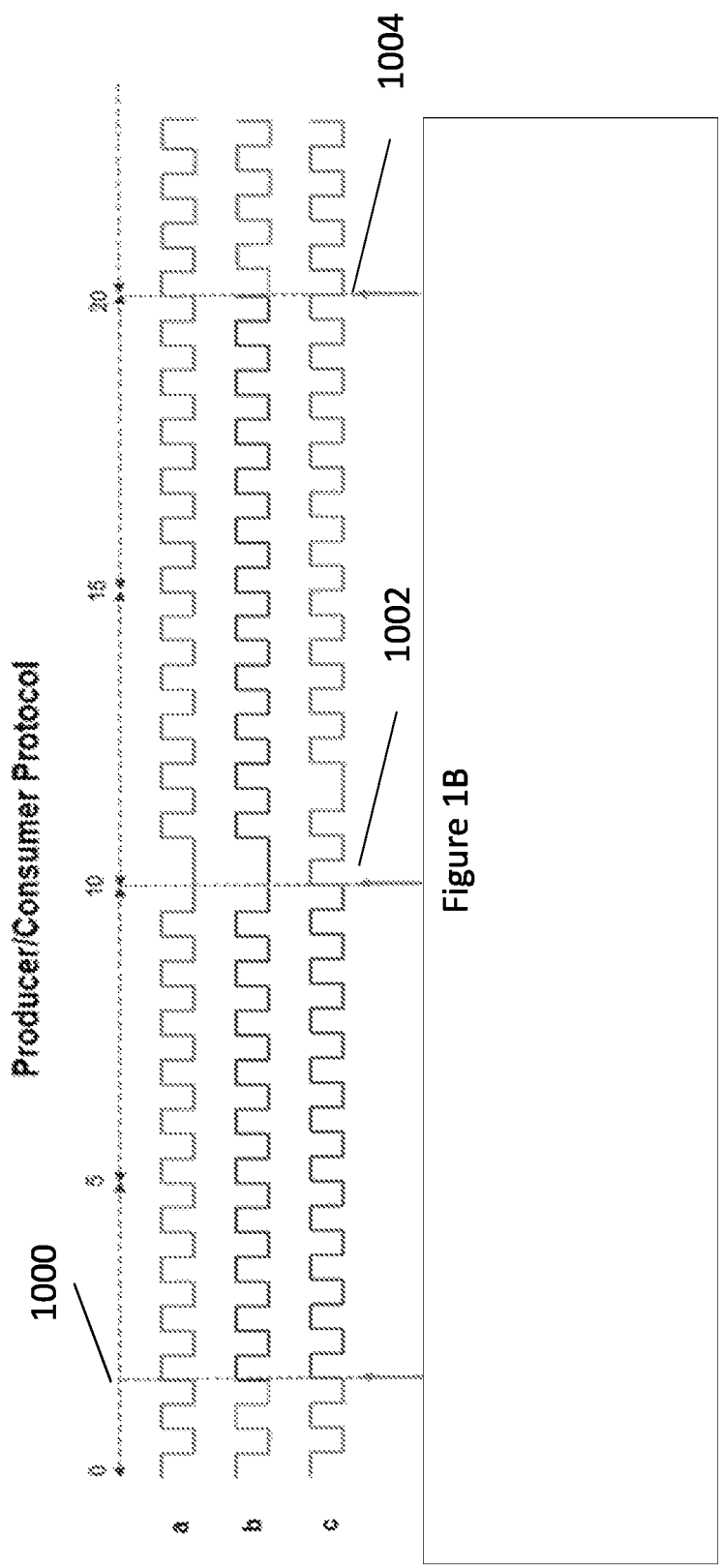
FIG. 1B illustrates example of producer/consumer entity protocol in accordance with an embodiment of the present disclosure.

FIG. 1B illustrates an example of the producer/consumer entity protocol. As illustrated in FIG. 1B, at 1000, signal b and c are designated as slave signals starts following signal a which is designated as a master signal. Signal a is continuously being dumped and the slave signals b and c are no longer dumped. At 1002, signal c is de-aliased from signal a (thereby starts un-following) and dumping of signal c is resumed. At 1004, signal b is de-aliased from signal a (thereby starts un-following) and dumping of signal b is resumed.

Figure 2A:
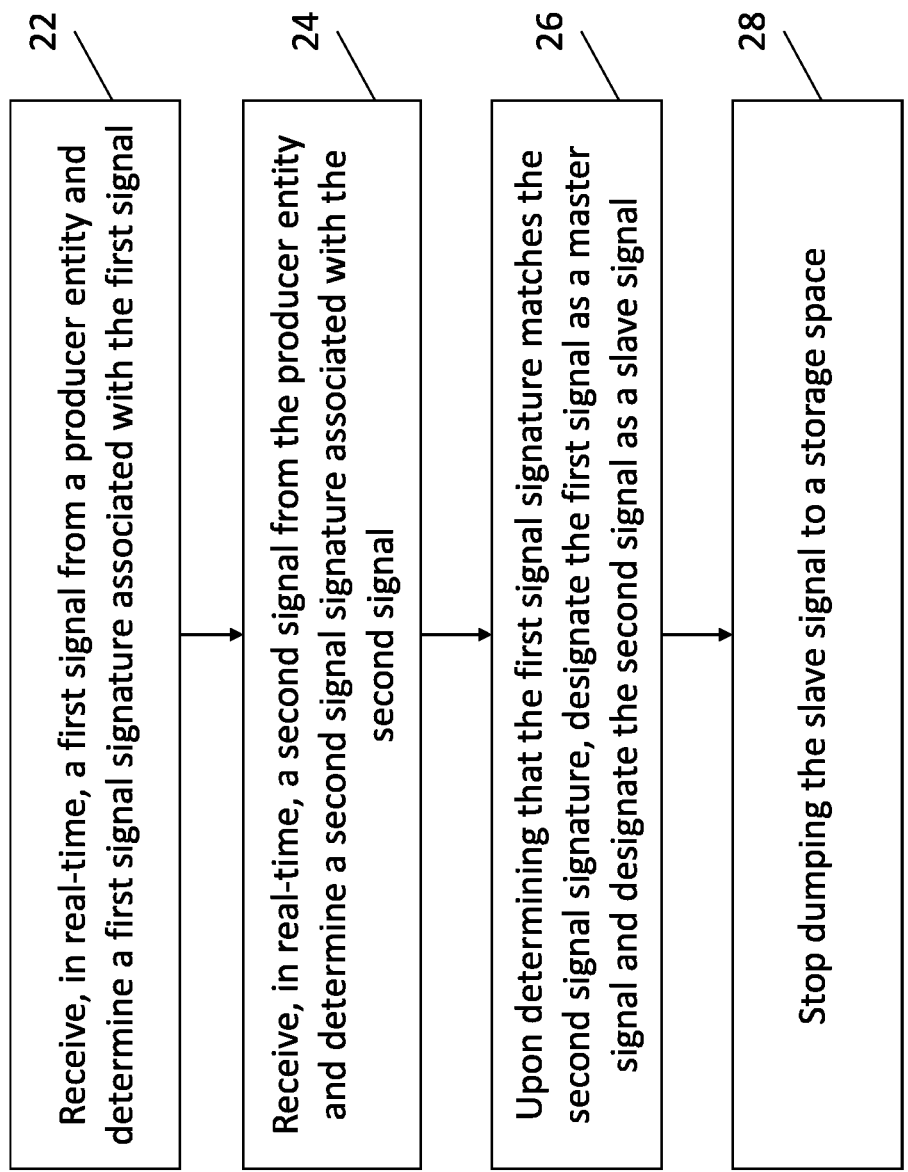
FIGS. 2A and 2B illustrate a flowcharts of operations performed by a system for efficiently dumping signals during hardware description language emulation in accordance with example embodiments of the present disclosure.
Figure 2B:
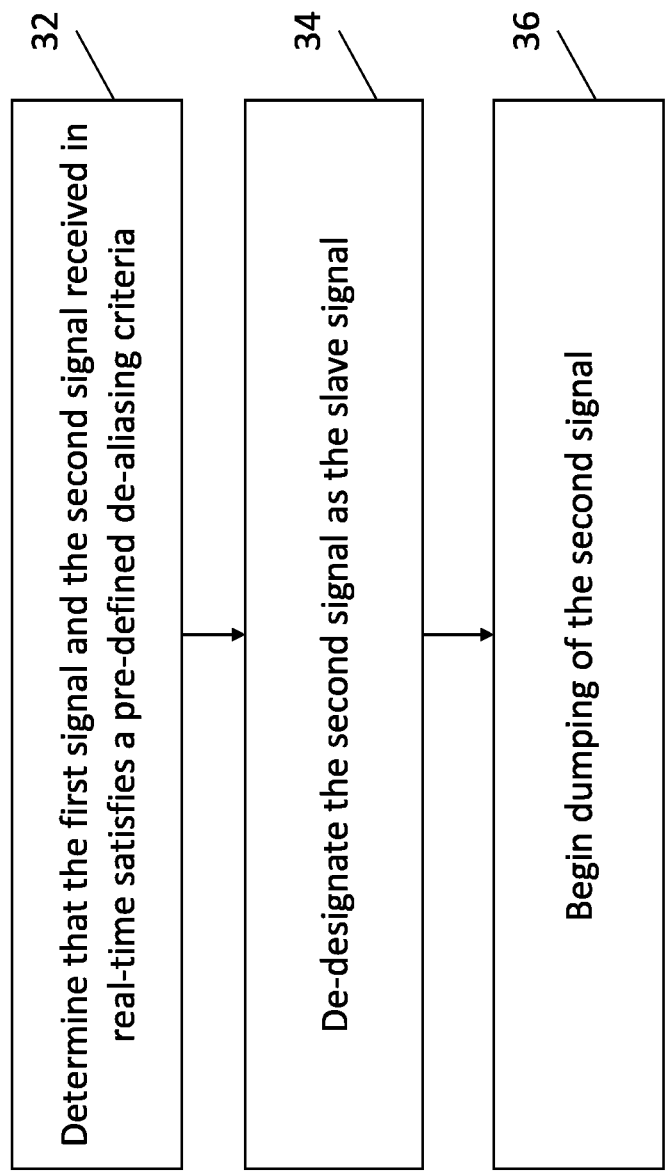

FIGS. 2A and 2B illustrate a flowcharts of operations performed by a system for efficiently dumping signals during hardware description language emulation in accordance with example embodiments of the present disclosure. As illustrated in block 22 of FIG. 2A, the system is configured to receive, in real-time, a first signal from a producer entity and determine, in real-time, a first signal signature associated with the first signal. In some embodiments, the first signal is a signal encoding one or more symbols such as one or more bits. In some embodiments, the system is configured to begin dumping the first signal as soon as the system receives the first signal.

In some embodiments, the producer entity is a hardware description language simulator configured to transmit one or more signals to a consumer entity and the consumer entity is configured to compress and dump the one or more signals to a storage space (such a hard disk drive).

In some embodiments, determining the first signal signature associated with the first signal comprises hashing a pre-defined number of bits in the first signal. In some embodiments, hashing the first signal begins immediately after receiving the pre-defined number of bits in the first signal (so that enough bits are received for hashing). In some embodiments, hashing the pre-defined number of bits in the first signal begins after a pre-defined interval after receiving the per-defined number of bits in the first signal, and wherein the pre-defined interval is defined by either time or number of bits.

As illustrated in block 24 of FIG. 2A, the system is configured to receive, in real-time, a second signal from the producer entity and determine a second signal signature associated with the second signal. Similar to the first signal, in some embodiments, the second signal is a signal encoding one or more symbols such as one or more bits. In some embodiments, the system is configured to begin dumping the second signal as soon as the system receives the second signal.

In some embodiments, determining the second signal signature associated with the second signal comprises hashing a pre-defined number of bits in the second signal. In some embodiments, hashing the second signal begins immediately after receiving the pre-defined number of bits in the second signal (so that enough bits are received for hashing). In some embodiments, hashing the pre-defined number of bits in the second signal begins after a pre-defined interval after receiving the per-defined number of bits in the second signal, and wherein the pre-defined interval is defined by either time or number of bits.

In some embodiments, the first signal and the second signal are signals that are previously designated as fast signals. Because such dynamic aliasing mechanism require some extra memory, in some embodiments, only fast signals would be processed in this workflow as the first signal or the second signal.

As illustrated in block 26 of FIG. 2A, the system is configured to determine that the first signal signature matches the second signal signature. Upon determining that the first signal signature matches the second signal signature, the system is configured to designate the first signal as a master signal and designate the second signal as a slave signal. In some embodiments, the first signal signature is determined to match the second signal signature if the hashes associated with the first signal and the second signal match. In some embodiments, the hashes match if the symbols (e.g., bits) used for hashing the signal have the same value. In some embodiments, the hashes associated with the first signal and the second signal match if the symbols (e.g., bits) used for hashing the signal have values that are similar enough that would result in the symbols having the same hash.

As illustrated in block 28 of FIG. 2A, the system is configured to stop dumping the second signal to the storage space. For example, after the second signal is designated as the slave signal, the system would stop dumping the second signal until the second signal is de-designated as the slave signal. In some embodiments, the system is configured to render, on a user interface, a graphical element representing that the slave signal is not dumped. In some embodiments, a waveform of the master signal may be rendered on the user interface. In some embodiments, waveforms of signals being currently dumped may be rendered on the user interface and slave signals may be displayed as "following master signal".

After the system stops dumping the second signal, the system may be configured to periodically, or otherwise determine whether the first and the second signal received in real-time satisfies a pre-defined de-aliasing criteria as illustrated in FIG. 2B. In some embodiments, a pre-defined learn phase is designated based on time lapsed or number of symbols received. In some embodiments, the system is configured to determine whether the first and the second signal received in real-time satisfies a pre-defined de-aliasing criteria as illustrated in FIG. 2B during the learn phase. In some embodiments, the system is configured to determine signal signatures as illustrated in FIG. 2A only during the learn phase.

In some embodiments, the learn phase is pre-defined to occur after a pre-defined time lapse or a pre-defined number of symbols are received. For example, the system may be configured to enter learn phase for one thousand symbols after each one hundred thousand symbols received. In some embodiments, the system the system may be configured to enter learn phase dynamically such as entering learn phase for the first one thousand symbols received, after the first ten thousand symbols, and then after each one hundred thousand symbols received thereafter.

In some embodiments, determining the first signal changed may include determining that the first signal signature associated with the first signal changed and determining the second signal changed may include determining that the second signal signature associated with the first signal changed. For example, in some embodiments, during the learn phase, the system is configured to re-determine the signal signature of the first signal and the second signal. In some embodiments, the system is configured to determine that the first signal and/or the second signal has changed based on a change in the respective signal signature instead of directly comparing symbol values.

As illustrated in block 32 of FIG. 2B, the system is configured to determine, in real-time, that the first signal and the second signal received in real-time satisfies a pre-defined de-aliasing criteria previously explained.

As illustrated in block 34 of FIG. 2B, the system is configured to de-designate the second signal as the slave signal.

As illustrated in block 36 of FIG. 2B, the system is configured to begin, in real-time (e.g., by resuming), dumping of the second signal because the second signal is de-designated as the slave signal (i.e., the second signal is de-aliased from the first signal).

It should be noted that while embodiments are described in context of an HDL simulators, one skilled in the art will appreciate that the embodiments may be applied in context of an emulator system or a prototype system.

Detailed Description—Technology Support

General Computer Explanation

Figure 3A:
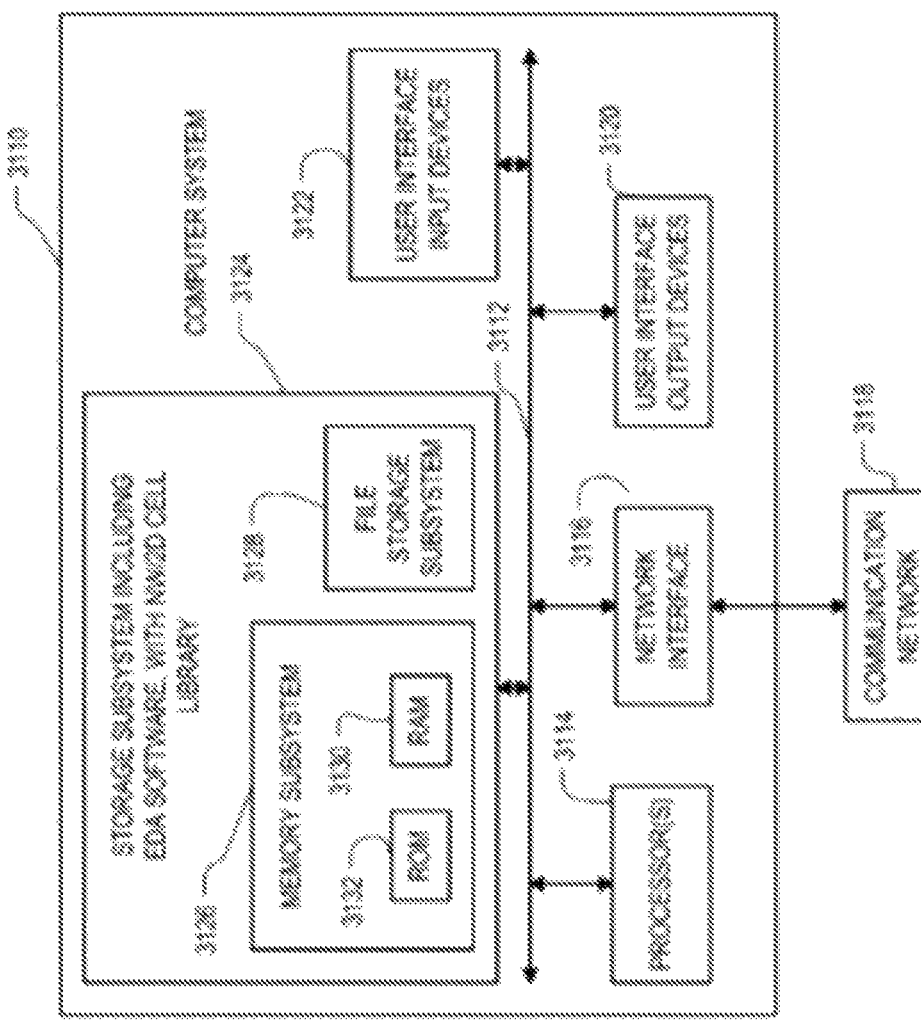
FIGS. 3A, 3B and 3C are simplified block diagrams of a computer system suitable for use with embodiments of the technology, as well as circuit design and circuit embodiments of the technology.
Figures 3B, 3C:
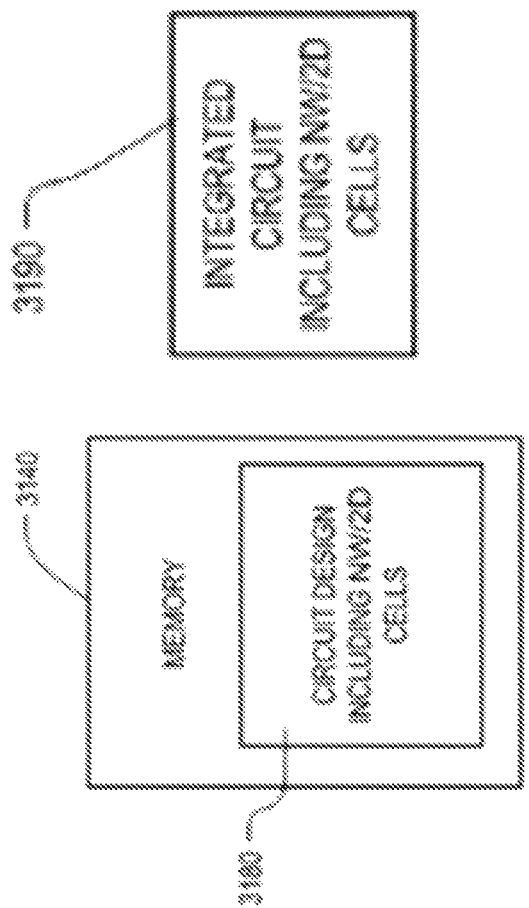

FIGS. 3A, 3B and 3C are simplified block diagrams of a computer system suitable for use with embodiments of the technology, as well as circuit design and circuit embodiments of the technology.

In FIG. 3A, computer system 3110 may include at least one computer or processor 3114 which communicates with a number of peripheral devices via bus subsystem 3112. The computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a rack-mounted "blade", a kiosk, a television, a game station, a network router, switch or bridge, or any data processing machine capable of executing instructions 124 (sequential or otherwise) that specify actions to be taken by that machine.

The computer system may include an operating system, such as Microsoft's Windows, Sun Microsystems's Solaris, Apple Computer's MacOS, Linux or Unix. The computer system also may include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi processor or multi-core system and may use or be implemented in a distributed or remote system. The term 'processor' here is used in the broadest sense to include a singular processor and multi-core or multi processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 3A is intended only as one example for purposes of illustrating the preferred embodiments. Many other configurations of computer system 3110 are possible having more or less components than the computer system depicted in FIG. 3A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 3122 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 3110 or onto communication network 3118. User interface input devices allow a user to select objects, icons, text and the like that appear on some types of user interface output devices, for example, a display subsystem.

User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 may include a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 3B depicts a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 3C signifies an integrated circuit 3190 created with the described technology that includes one or more cells selected, for example, from a cell library.

Detailed Description—Technology Support

EDA System/Workflow Explanation

Figure 4:
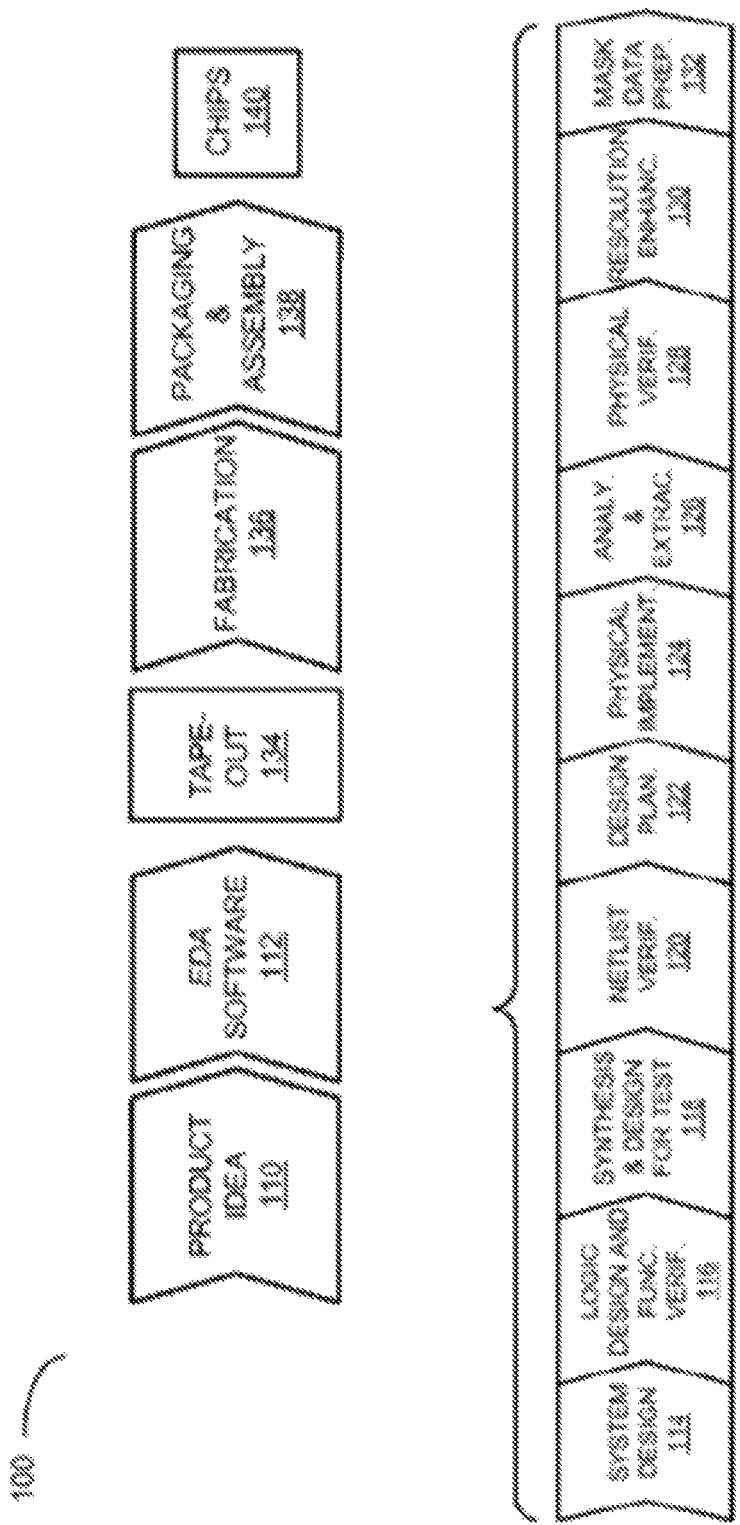
FIG. 4 depicts various operations in the design and fabrication of an integrated circuit in accordance with an embodiment of the present disclosure.

FIG. 4 illustrates various processes performed in the design, verification, and fabrication of an item of manufacture such as an integrated circuit using software tools with a computer, and possibly special hardware-assisted tools, to transform and verify design data and instructions that represent the integrated circuit. These processes start with the generation of a product idea (110) with information supplied by a designer, information which is transformed during a process to create an item of manufacture (referred to herein as a design or device) that uses EDA (Electronic Design Automation) software tools (112), which may also be signified herein as EDA software, as a design tool or a verification tool. When the design is finalized, it can be taped-out (134), which may be when artwork (e.g., geometric patterns) for the integrated circuit is sent to a fabrication facility to manufacture the mask set, which is then used to manufacture the integrated circuit. After tape-out, a semiconductor die is fabricated (136) and packaging and assembly processes (138) are performed, which result in the finished integrated circuit (140) which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses EDA software tools (112) includes processes 114-132, which are described below. This design flow description is for illustration purposes only and is not meant to limit the present disclosure. For example, an actual integrated circuit design may require a designer to perform the design operations in a different sequence than the sequence described herein.

During system design (114), a designer describes the functionality to be manufactured. The designer can also perform what-if planning to refine the functionality and to check costs, etc. Hardware-software architecture partitioning can occur at this stage. Exemplary EDA software products from Synopsys, Inc. of Mountain View, Calif. that can be used at this stage include: Model Architect, Saber, System Studio, and Designw are products.

During logic design and functional verification (116), modules in the circuit are specified in one or more hardware description languages, or HDLs, and the design in HDL is checked for functional accuracy, that is, to match the requirements of the specification of the circuit or system being designed to ensure that the design produces the correct outputs. Exemplary HDL languages are Verilog, VHDL and SystemC. Functional verification may be done by using software-based simulators and other tools such as testbench generators, static HDL checking tools and formal verification tools. In some situations, special hardware referred to as 'emulators' or prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink® (RTM="Registered Trademark").

During synthesis and design for test (118), HDL code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification (120), the netlist is checked for compliance with timing constraints and for correspondence with the HDL code. Exemplary EDA software products from Synopsys, Inc. of Mountain View, Calif. that can be used at this stage include: Formality, Primetime, and VCS products.

During design planning (122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation (124), the physical placement (positioning of circuit elements such as transistors or capacitors) and routing (connection of the same by a plurality of conductors) occurs, as can selection of library cells to perform specific logic functions. Exemplary EDA software products from Synopsys, Inc. of Mountain View, Calif. that can be used at this stage include: the Astro and IC Compiler products.

During analysis and extraction (126), the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification (128), the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement (130), geometric manipulations of the layout are performed to improve manufacturability of the design. Exemplary EDA software products from Synopsys, Inc. of Mountain View, Calif. that can be used at this stage include: Proteus products.

During tape-out, data is created to be used (after lithographic enhancements are applied if appropriate) for production of lithography masks. Example EDA software products from Synopsys, Inc., that can be used during tape-out include the IC Compiler and Custom Designer families of products.

During mask-data preparation (132), the tape-out data is used to produce lithography masks that are used to produce finished integrated circuits. Exemplary EDA software products from Synopsys, Inc. of Mountain View, Calif. that can be used at this stage include the CATS family of products.

For all of the above-mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during one or more of the above-described stages. Specifically, some embodiments of the present disclosure can be used in EDA software (112).

A storage subsystem is preferably used to store the programs and data structures that provide the functionality of some or all of the EDA tools described herein, and tools applied for development of cells for the library and for physical and logical design using the library.

Detailed Description—Technology Support

Emulation Environment Explanation

Figure 5:
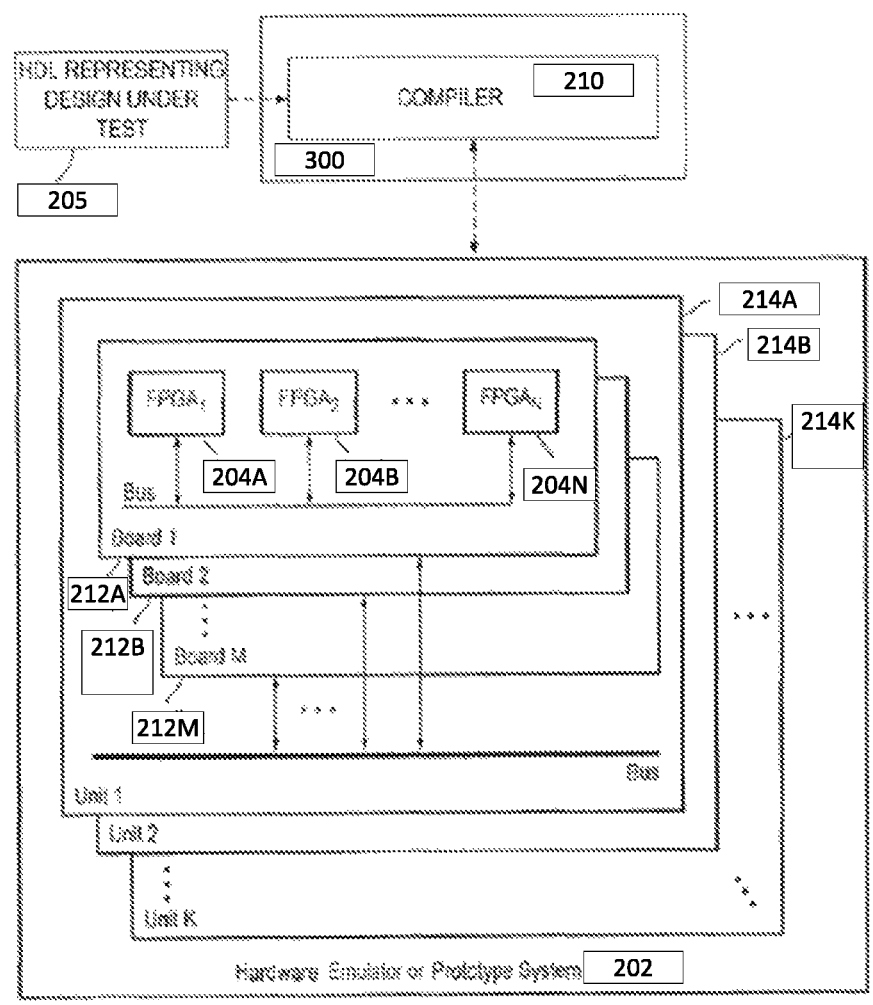
FIG. 5 is a schematic diagram of an exemplary emulation system in accordance with an embodiment of the present disclosure.

An EDA software system, such as element 112 depicted in FIG. 4, may include an emulation system 116 to verify the functionality of the circuit design. FIG. 5 depicts an example emulation system which includes a host computer system 300 (often part of an EDA system) and an emulator system 202 (may be a set of programmable devices such as Field Programmable Gate Arrays (FPGAs)). The host system generates data and information, using a compiler 210, to configure the emulator to emulate a circuit design. One of more circuit designs to be emulated are referred to as a DUT (Design Under Test). The emulator is a hardware system that emulates a DUT, for example, to use the emulation results for verifying the functionality of the DUT. One example of an emulation system that can be used for the embodiments disclosed herein is the ZeBu Server available from Synopsys, Inc.

The host system 300 comprises one or more processors. In the embodiment where the host system is comprised of multiple processors, the functions described herein as being performed by the host system may be distributed among the multiple processors.

The host system 300 may include a compiler 210 that processes code written in a hardware description language that represents a DUT, producing data (typically binary) and information that is used to configure the emulation system 202 to emulate the DUT. The compiler 210 may transform, change, reconfigure, add new functions to, and/or control the timing of the DUT.

The host system and emulator exchange data and information using signals carried by an emulation connection. The connection can be one or more electrical cables, for example, cables with pin configurations compatible with the Recommended Standard (RS) 232 or Universal Serial Bus (USB) protocols. The connection can be a wired communication medium or network, such as a local area network, or a wide area network such as the Internet. The connection can be a wireless communication medium or a network with one or more points of access, using a wireless protocol such as Bluetooth® or Institute of Electrical and Electronics Engineers (IEEE) 802.11. The host system and emulator can exchange data and information through a third device, such as a network server.

The emulator includes multiple FPGAs (or other programmable devices), for example, elements 204A to 204N in FIG. 2. Each FPGA can include one or more FPGA interfaces through which the FPGA is connected to other FPGAs of the emulator (and potentially other emulator hardware components), in order for the FPGAs to exchange signals. An FPGA interface may also be referred to as an input/output pin or an FPGA pad. While some embodiments disclosed herein make use of emulators comprising FPGAs, other embodiments can include other types of logic blocks instead of or along with, the FPGAs for emulating DUTs, for example, custom FPGAs, specialized ASICs for emulation or prototyping, memories, and input/output devices.

A programmable device may include an array of programmable logic blocks and a hierarchy of reconfigurable interconnects that allow the programmable logic blocks to be connected to each other according to the descriptions in the HDL code. Each of the programmable logic blocks can be configured to perform complex combinational functions, or merely simple logic gates, such as AND, and XOR logic blocks.

In many FPGAs, logic blocks also include memory elements, which may be simple latches, flip-flops or more complex blocks of memory. Depending on the length of the interconnections between different logic blocks, signals may arrive at input terminals of the logic blocks at different times.

Programmable processors 204A-204N may be placed into one or more hardware boards 212A through 212M Many of such boards may be placed into a hardware unit, e.g. 214A. The boards within a unit may be connected using the backplane of the unit or any other types of connections. In addition, multiple hardware units (e.g., 214A through 214K) may be connected to each other by cables or any other means to form a multi-unit system. In some embodiments, the hardware emulation or prototype system 202 may be formed using a single board, a single unit with multiple boards, or with multiple units without departing from the teachings of the present disclosure.

For a DUT is to be emulated, the emulator receives from the host system one or more bit files including a description of the DUT. The bit files further specify partitions of the DUT created by the host system with trace and injection logic, mappings of the partitions to the FPGAs of the emulator, and design constraints. Based on the bit files, the emulator configures the FPGAs to perform the functions of the DUT. With some emulators, one or more FPGAs of an emulator already have the trace and injection logic built into the silicon of the FPGA. For this type of emulator, the FPGAs don't have to be configured by the host system to emulate trace and injection logic.

The host system 110 receives (e.g., from a user or from a data store) a description of a DUT that is to be emulated. In one embodiment, the DUT description is in a hardware description language (HDL), such as register transfer language (RTL). In another embodiment, the DUT description is in netlist level files, or a mix of netlist level files and HDL files. If part of the DUT description or the entire DUT description is in a HDL, the host system synthesizes the DUT description to create a gate level netlist based on the DUT description. A host system can use the netlist of the DUT to partition the DUT into multiple partitions, with some of these partitions including trace and injection logic. The trace and injection logic traces interface signals exchanged via the interfaces of an FPGA. Additionally, the trace and injection logic can be used to inject traced interface signals into the logic of the FPGA. The host system maps each partition to an FPGA of the emulator. With some emulators, the trace and injection logic are only included in select partitions for a group of FPGAs. The trace and injection logic can be built into one or more of the FPGAs of an emulator. The host system may synthesize multiplexers to be mapped into the FPGAs. The multiplexers may be used by the trace and injection logic to inject interface signals into the DUT logic.

The host system creates bit files describing each partition of the DUT and the mapping of the partitions to the FPGAs. For partitions in which trace and injection logic was incorporated, the bit files also describe the incorporation of the logic. The bit files may also include place and route information and design constraints. The host system stores the bit files and also stores for components of the DUT information describing which FPGAs are to emulate each component of the DUT (to which FPGAs each component is mapped).

Upon request, the host system transmits the bit files to the emulator. The host system instructs the emulator to emulate the DUT. During emulation of the DUT or at the end of the emulation, the host system receives emulation results from the emulator through the emulation connection. Emulation results are data and information generated by the emulator based on the emulation of the DUT. The emulation results include interface signals (states of interface signals) traced by the trace and injection logic of each FPGA. The host system may store the emulation results, or transmit them to another processing system.

After emulation of the DUT, a user may request to debug a component of the DUT. If such a request is made the user may provide a time period of the emulation to debug. The host system identifies which FPGAs are configured to emulate the component based on the stored information. The host system retrieves stored interface signals associated with the time period and traced by the trace and injection logic of each identified FPGA. The host system instructs the emulator to re-emulate the identified FPGAs, either one by one, multiple at a time, or altogether. The host system transmits the retrieved interface signals to the emulator in order to re-emulate the component for the time period. The trace and injection logic of each identified FPGA injects its respective interface signals received from the host system into the logic of the DUT mapped to the FPGA. In case of multiple re-emulations of an FPGA, the results may be merged all together to have a full debug view.

The host system receives from the emulator signals traced by logic of the identified FPGAs during the re-emulation of the component. The host system stores the signals received from the emulator. The signals traced during the re-emulation can have a higher sampling rate than during the initial emulation. For example, in the initial run a traced signal may be comprised of a saved hardware state every X milliseconds. However, in the re-emulation the traced signal may be comprised of a saved hardware state every Y milliseconds, where Y is less than X. If the user requests to view a waveform of a signal traced during the re-emulation, the host system can retrieve the stored signal and display a plot of the signal (generates a waveform of the signal). Afterwards the user can, for example, request to re-emulate the same component but for a different time period or to re-emulate another component.

A host system may include at least seven sub-systems: a design synthesizer, a mapping module, a run time module, a results module, a debug module, a waveform module, and a storage module. Each of these sub-systems may be embodied as hardware, software, firmware, or a combination thereof. Together these components configure the emulator, and monitor the emulation results.

The design synthesizer converts the HDL of a DUT into gate level logic. For a DUT that is to be emulated, the design synthesizer receives a description of the DUT. If the description of the DUT is fully or partially in HDL (e.g., RTL or other level of abstraction), the design synthesizer 210 synthesizes the HDL of the DUT to create a gate-level netlist with a description of the DUT in terms of gate level logic.

The mapping module partitions DUTs and maps partitions to emulator FPGAs. The mapping module partitions a DUT at the gate level into a number of partitions using the netlist of the DUT. For each partition, the mapping module retrieves a gate level description of the trace and injection logic and incorporates the logic into the partition. As described above, the trace and injection logic included in a partition is configured to trace signals exchanged via the interfaces of an FPGA to which the partition is mapped (trace interface signals). The trace and injection logic can be incorporated into the DUT prior to the partitioning. For example, the trace and injection logic may be incorporated by the design synthesizer prior to or after the synthesizing the HDL of the DUT. Hence, the trace and injection logic may not match the partitions, it may be a subset, a superset or even different from the partitions.

In addition to including the trace and injection logic, the mapping module may include additional tracing logic in a partition in order to trace the states of certain DUT components that are not traced by the trace and injection logic (to trace signals other than the interface signals traced by the trace and injection logic). The mapping module may include the additional tracing logic in the DUT prior to the partitioning or in partitions after the partitioning. The design synthesizer can include the additional tracing logic in an HDL description of the DUT prior to synthesizing the description.

The mapping module maps each partition of the DUT to an FPGA of the emulator. The mapping module performs the partitioning and mapping using design rules, design constraints (e.g., timing or logic constraints), and information about the emulator. For components of the DUT, the mapping module stores information in the storage module describing which FPGAs are to emulate each component.

Based on the partitioning and the mapping, the mapping module generates one or more bit files that describe the created partitions and the mapping of logic to each FPGA of the emulator. The bit files may include additional information, such as constraints of the DUT, and routing information of connections between FPGAs and connections within each FPGA. The mapping module can generate a bit file for each partition of the DUT, which can be stored in the storage module. Upon request from a user, the mapping module transmits the bit files to the emulator, which the emulator uses to configure the FPGAs to emulate the DUT.

If the emulator includes specialized ASICs that include the trace and injection logic, the mapping module may generate a specific configuration allowing to connect them to the DUT or just save the information of what traced/injected signal is and where the information is stored on the specialized ASIC.

The run time module controls emulations performed on the emulator. The run time module may cause the emulator to start or stop executing an emulation. Additionally, the run time module may provide input signals/data to the emulator. The input signals may be provided directly to the emulator through the connection or indirectly through other input signal devices. For example, the host system with the run time module may control an input signal device to provide the input signals to the emulator. The input signal device may be, for example, a test board (directly or through cables), signal generator, another emulator, or another host system.

The results module processes emulation results generated by the emulator. During emulation and/or after completing the emulation, the results module receives emulation results from the emulator generated during the emulation. The emulation results include signals traced during the emulation. Specifically, the emulation results include interface signals traced by the trace and injection logic emulated by each FPGA. The emulation results may also include signals traced by additional logic included in the DUT. Each traced signal can span multiple cycles of the emulation. A traced signal is comprised of multiple hardware states and each hardware state is associated with a time of the emulation. The results module stores the traced signals received in the storage module. For each stored signal, the results module can store information indicating which FPGA generated the traced signal.

The debug module allows users to debug DUT components. After the emulator has emulated a DUT and the results module has received the interface signals traced by the trace and injection logic during the emulation, a user may request to debug a component of the DUT by re-emulating the component for a specific time period. In a request to debug a component, the user identifies the component and indicates a time period of the emulation to debug. The user's request can also include a sampling rate that indicates how often hardware states should be saved by logic that traces signals.

The debug module identifies the one or more FPGAs of the emulator that are configured to emulate the component based on the information stored by the mapping module in the storage module. For each identified FPGA, the debug module retrieves, from the storage module, interface signals traced by the trace and injection logic of the FPGA during the time period indicated by the user (i.e., retrieve hardware states traced by the trace and injection logic that are associated with the time period).

The debug module transmits the retrieved interface signals to the emulator. The debug module instructs the debug module to run the identified FPGAs and for the trace and injection logic of each identified FPGA to inject its respective traced signals into logic of the FPGA in order to re-emulate the component for the requested time period. The debug module can also transmit the sampling rate provided by the user to the emulator so that the tracing logic traces hardware states at the proper intervals.

To debug the component, the emulator only has to run the FPGAs to which the component has been mapped. Additionally, the re-emulation of the component does not have to start from the beginning but can start at any point desired by the user.

For an identified FPGA, the debug module can transmit instructions to the emulator to load multiple emulator FPGAs with the same configuration of the identified FPGA. The debug module additionally instructs the emulator to run the multiple FPGAs in parallel. Each FPGA from the multiple FPGAs is run with a different time window of the interface signals in order to generate a larger time window in a shorter amount of time. For example, for the identified FPGA to run a certain amount of cycles it may take an hour. However, if multiple FPGAs are loaded with the configuration of the identified FPGA and each of the FPGAs runs a subset of the cycles, it may only take a few minutes for the FPGAs to collectively run all of the cycles.

A user may identify a hierarchy or a list of DUT signals to re-emulate. To enable this, the debug module determines the FPGA needed to emulate the hierarchy or list of signals, retrieves the necessary interface signals and transmits the retrieved interface signals to the emulator for re-emulation. Hence, a user can identify any element (e.g., component or signal) of the DUT to debug/re-emulate.

The waveform module generates waveforms based on traced signals. If a user requests to view a waveform of a signal traced during an emulation run, the host system retrieves the signal from the storage module. The waveform module displays a plot of the signal to the user. For one or more signals, when the signals are received from the emulator, the waveform module can automatically generate the plots of the signals.

Detailed Description—Semantic Support

The signifier 'commercial solution' signifies, solely for the following paragraph, an engineering domain-specific (and thus non-preemptive—see Bilski) electronic structure, process for specified machines, manufacturable circuit (and their Church-Turing equivalents) or composition of matter that is useful in commerce to solve a problem of technology, that is, a use in commerce of an application of science or use in commerce of technology.

The signifier 'abstract' (when used in a patent claim for any embodiments disclosed herein for a new commercial solution that is a scientific application of one or more laws of nature {see Benson}, and that solves a problem of technology {see Diehr} used in commerce—or improves upon an existing commercial solution {see Diehr})—is precisely defined by the inventor(s) {see MPEP 2111.01} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is "difficult to understand" {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art items that can be combined {see Alice} by a person having ordinary skill in the art {a "PHOSITA", see MPEP 2141-2144} to be equivalent to the new commercial solution, and is thus unpatentable under 35 U.S.C. 103, for example, because it is "difficult to understand" how the new commercial solution differs from a PHOSITA-combination/-application of the existing prior art; or c) a new commercial solution is 'abstract' if it is not disclosed with an enabling description either because there is insufficient guidance in the enabling description, or because only a generic implementation is described {see Mayo} with unspecified elements, parameters or functionality, so that a PHOSITA is unable to instantiate a useful embodiment of the new commercial solution, without, for example, requiring special programming {see Katz} or circuit design to be performed by the PHOSITA), and is thus unpatentable under 35 U.S.C. 112, for example, because it is "difficult to understand" how to use in commerce any embodiment of the new commercial solution.

DETAILED Description—Conclusion

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosto signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A computer-implemented method for efficiently dumping signals during hardware description language emulation, the method comprising:
  receiving, in real-time, a first signal from a producer entity, wherein the first signal comprises one or more symbols;
  generating, in real-time, a first signal signature associated with the first signal, the first signal signature representing a pre-defined characteristic of the first signal;
  receiving, in real-time, a second signal from the producer entity, wherein the second signal comprises one or more symbols;
  generating, in real-time, a second signal signature associated with the second signal, the second signal signature representing the pre-defined characteristic of the second signal; and
  upon determining that the first signal signature matches the second signal signature, stopping dumping the second signal to a storage space.

2. The method of claim 1, wherein the producer entity is a hardware description language simulator configured to transmit one or more signals to a consumer entity, wherein the consumer entity is configured to compress and dump the one or more signals to the storage space.

3. The method of claim 1, wherein generating the first signal signature associated with the first signal comprises hashing a pre-defined number of bits in the first signal and generating the second signal signature associated with the second signal comprises hashing the pre-defined number of bits in the second signal.

4. The method of claim 3, wherein hashing the first signal begins immediately after receiving the pre-defined number of bits in the first signal.

5. The method of claim 4, wherein hashing the pre-defined number of bits in the first signal begins after a pre-defined interval after receiving the per-defined number of bits in the first signal, and wherein the pre-defined interval is defined by either time or number of bits.

6. The method of claim 1, wherein the first signal is being dumped to the storage space upon receipt, and wherein the second signal is being dumped to the storage space upon receipt and until the stopping.

7. The method of claim 1, further comprising:
  determining, in real-time, that the first signal and the second signal received in real-time satisfies a pre-defined de-aliasing criteria;
  beginning dumping of the second signal to the storage space in real-time.

8. The method of claim 7, wherein the pre-defined de-aliasing criteria is satisfied upon determining one or more of:
  the first signal changed, and the second signal did not change;
  the second signal changed, and the first signal did not change; or
  the second signal changed, and the first signal has changed more times than the second signal.

9. The method of claim 8, wherein determining the first signal changed comprises determining that the first signal signature associated with the first signal changed, and wherein determining the second signal changed comprises determining that the second signal signature associated with the second signal changed.

10. The method of claim 1, further comprising rendering, on a user interface, a graphical element representing that the second signal is not dumped.

11. A system for efficiently dumping signals during hardware description language emulation, the system comprising at least one processor and at least one memory including computer program code, the at least one memory and the computer program code configured to, with the processor, cause the system to at least:
  receive, in real-time, a first signal from a producer entity, wherein the first signal comprises one or more symbols;
  generate, in real-time, a first signal signature associated with the first signal, the first signal signature representing a pre-defined characteristic of the first signal;
  receive, in real-time, a second signal from the producer entity, wherein the second signal comprises one or more symbols;
  generate, in real-time, a second signal signature associated with the second signal, the second signal signature representing a pre-defined characteristic of the second signal;
  upon determining that the first signal signature matches the second signal signature, stop dumping the second signal to a storage space.

12. The system of claim 11, wherein the producer entity is a hardware description language simulator configured to transmit one or more signals to a consumer entity, wherein the consumer entity is configured to compress and dump the one or more signals to the storage space.

13. The system of claim 11, wherein generating the first signal signature associated with the first signal comprises hashing a pre-defined number of bits in the first signal and generating the second signal signature associated with the second signal comprises hashing the pre-defined number of bits in the second signal.

14. The system of claim 13, wherein hashing the first signal begins immediately after receiving the pre-defined number of bits in the first signal.

15. The system of claim 14, wherein hashing the pre-defined number of bits in the first signal begins after a pre-defined interval after receiving the per-defined number of bits in the first signal, and wherein the pre-defined interval is defined by either time or number of bits.

16. The system of claim 11, wherein the system is configured to dump the first signal to the storage space upon receipt, and wherein the system is configured to dump the second signal to the storage space upon receipt until the system stop dumping the second signal.

17. The system of claim 11, wherein the at least one memory and the computer program code are further configured to, with the processor, cause the system to:
  determine, in real-time, that the first signal and the second signal received in real-time satisfies a pre-defined de-aliasing criteria;
  begin dumping of the second signal to the storage space in real-time.

18. The system of claim 17, wherein the pre-defined de-aliasing criteria is satisfied upon determining one or more of:
  the first signal changed, and the second signal did not change;
  the second signal changed, and the first signal did not change; or
  the second signal changed, and the first signal has changed more times than the second signal.

19. The system of claim 18, wherein determining the first signal changed comprises determining that the first signal signature associated with the first signal changed, and wherein determining the second signal changed comprises determining that the second signal signature associated with the second signal changed.

20. The system of claim 11, wherein the at least one memory and the computer program code are further configured to, with the processor, cause the system to render, on a user interface, a graphical element representing that the slave signal is not dumped.

\* \* \* \* \*